(12) United States Patent
Mochizuki et al.

(10) Patent No.: US 7,016,093 B2
(45) Date of Patent: Mar. 21, 2006

(54) OPTICAL SCANNING APPARATUS AND IMAGE FORMING APPARATUS

(75) Inventors: Takeshi Mochizuki, Ibaraki (JP); Susumu Tateyama, Ibaraki (JP); Kazutaka Setoma, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 0 days.

(21) Appl. No.: 11/024,622

(22) Filed: Dec. 30, 2004

(65) Prior Publication Data
US 2005/0162723 A1    Jul. 28, 2005

(30) Foreign Application Priority Data
Jan. 19, 2004    (JP)    ............................ P2004-010264

(51) Int. Cl.
*G02B 26/08*    (2006.01)
(52) U.S. Cl. ...................... 359/205; 359/206; 359/212; 359/216; 347/232; 347/259
(58) Field of Classification Search ......... 359/205–206
See application file for complete search history.

(56) References Cited

U.S. PATENT DOCUMENTS

| 5,781,325 A | * | 7/1998 | Sekikawa ............... 359/216 |
| 5,825,522 A | * | 10/1998 | Takano et al. ........... 359/201 |
| 2004/0104994 A1 | * | 6/2004 | Ishihara et al. | |

FOREIGN PATENT DOCUMENTS

| JP | 5-136951 | 6/1993 |
| JP | 2001-56445 | 2/2001 |
| JP | 2002-202648 | 7/2002 |

\* cited by examiner

*Primary Examiner*—James Phan
(74) *Attorney, Agent, or Firm*—McGinn IP Law Group, PLLC

(57) ABSTRACT

In an optical scanning apparatus, a light beam emitted from a light source is deflected and scanned by a light deflecting member, and then scanned and imaged with substantial speed uniformity onto a medium to be scanned by a scanning optical element. The apparatus is configured so that, when the angle formed by the light beam that is deflected and scanned and the optical axis of the scanning optical element is $\theta$, the amount of positional deviation due to deviation from speed uniformity of the light beam on the medium to be scanned is $\epsilon(\theta)$, the spatial scan density on the medium to be scanned is P, and the maximum of an absolute value of the angle $\theta$ is $\theta o$, an expression of $|d\epsilon(\theta)/d\theta| \leq 5.0 \times 10/P\theta o$ holds.

6 Claims, 3 Drawing Sheets

OPTICAL SCANNING APPARATUS AND IMAGE FORMING APPARATUS

BACKGROUND OF THE INVENTION

1. Field of the Invention

The present invention relates to an optical scanning apparatus, and also to an image forming apparatus provided with such an optical scanning apparatus.

2. Description of the Related Art

In an optical scanning apparatus, conventionally, a rotary polygon mirror as light deflecting member, an Fθ lens or an Fθ mirror as a scanning optical element, and a photosensitive drum as a medium to be scanned are generally used. The shape of the Fθ lens or the Fθ mirror is optimized so that a light beam on the photosensitive drum attains speed uniformity or substantial speed uniformity with respect to the rotary polygon mirror which is rotated at a constant speed (for example, see JP-A-2001-056445 (Abstract)).

The scanning position may be deviated because of, for example, relative positional deviation between the Fθ lens and the photosensitive drum. In such a case, the scanning position is sometimes adjusted by controlling the delay time from detection of the horizontal synchronizing signal to minutely correct the scanning angle (for example, see JP-A-5-136951 (Abstract) and JP-A-2002-202648 (Abstract)). However, there is a problem in that speed uniformity of the light beam on the photosensitive drum after the adjustment is changed from that before the adjustment, and therefore the accuracy is lowered.

SUMMARY OF THE INVENTION

It is an object of the invention to provide an optical scanning apparatus in which a change in speed uniformity due to adjustment of a scanning position on a medium to be scanned can be suppressed to a low level, and also to provide an image forming apparatus including such an optical scanning apparatus.

According to a first aspect of the invention, an optical scanning apparatus includes: a light deflecting member for deflecting and scanning a light beam emitted from a light source; and a scanning optical element which scans and images the light beam that is deflected and scanned by the light deflecting member, onto a medium to be scanned. The optical scanning apparatus satisfies following equation:

$$|d\epsilon(\theta)/d\theta| \leq 5.0 \times 10/P\theta o$$

where θ is an angle formed by the light beam that is deflected and scanned by the light deflecting member and an optical axis of the scanning optical element, $\epsilon(\theta)$ is an amount of positional deviation due to deviation from speed uniformity of the light beam on the medium to be scanned, P is a spatial scan density on the medium to be scanned, and θo is a maximum of an absolute value of the angle θ.

According to a second aspect of the invention, an image forming apparatus includes an optical scanning apparatus comprising: a light deflecting member for deflecting and scanning a light beam emitted from a light source; and a scanning optical element which scans and images the light beam that is deflected and scanned by the light deflecting member, onto a medium to be scanned, and the optical scanning apparatus satisfies following equation:

$$|d\epsilon(\theta)/d\theta| \leq 5.0 \times 10/P\theta o$$

where θ is an angle formed by the light beam that is deflected and scanned by the light deflecting member and an optical axis of the scanning optical element, $\epsilon(\theta)$ is an amount of positional deviation due to deviation from speed uniformity of the light beam on the medium to be scanned, P is a spatial scan density on the medium to be scanned, and θo is a maximum of an absolute value of the angle θ.

According to a third aspect of the invention, an multicolor image forming apparatus comprising a plurality of optical scanning apparatuses comprising: a light deflecting member for deflecting and scanning a light beam emitted from a light source; and a scanning optical element which scans and images the light beam that is deflected and scanned by the light deflecting member, onto a medium to be scanned, and the optical scanning apparatus satisfies following equation:

$$|d\epsilon(\theta)/d\theta| \leq 5.0 \times 10/P\theta o$$

where θ is an angle formed by the light beam that is deflected and scanned by the light deflecting member and an optical axis of the scanning optical element, $\epsilon(\theta)$ is an amount of positional deviation due to deviation from speed uniformity of the light beam on the medium to be scanned, P is a spatial scan density on the medium to be scanned, and θo is a maximum of an absolute value of the angle θ.

According to the invention, it is possible to prevent the accuracy of speed uniformity of the light beam on the medium to be scanned from being lowered as a result of adjustment of deviation in the scanning position due to relative positional deviation between the scanning optical element and the medium to be scanned.

DETAILED DESCRIPTION OF THE PREFFERED EMBODIMENTS

Figure 2:
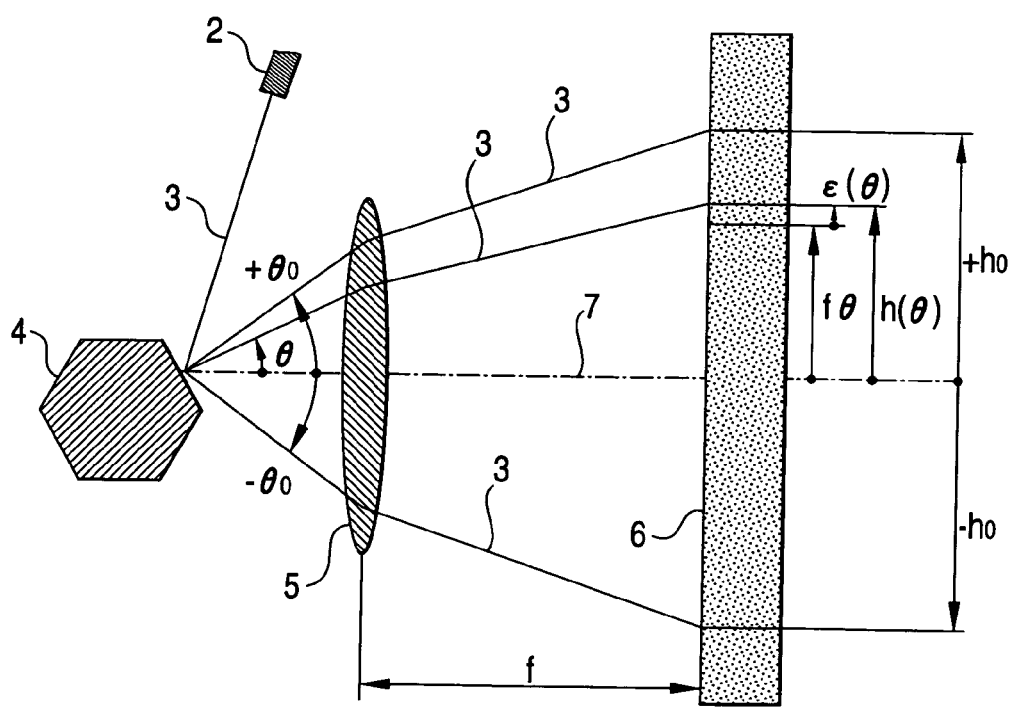
FIG. 2 is a view showing the function of the optical scanning apparatus of the invention.
Figure 3:
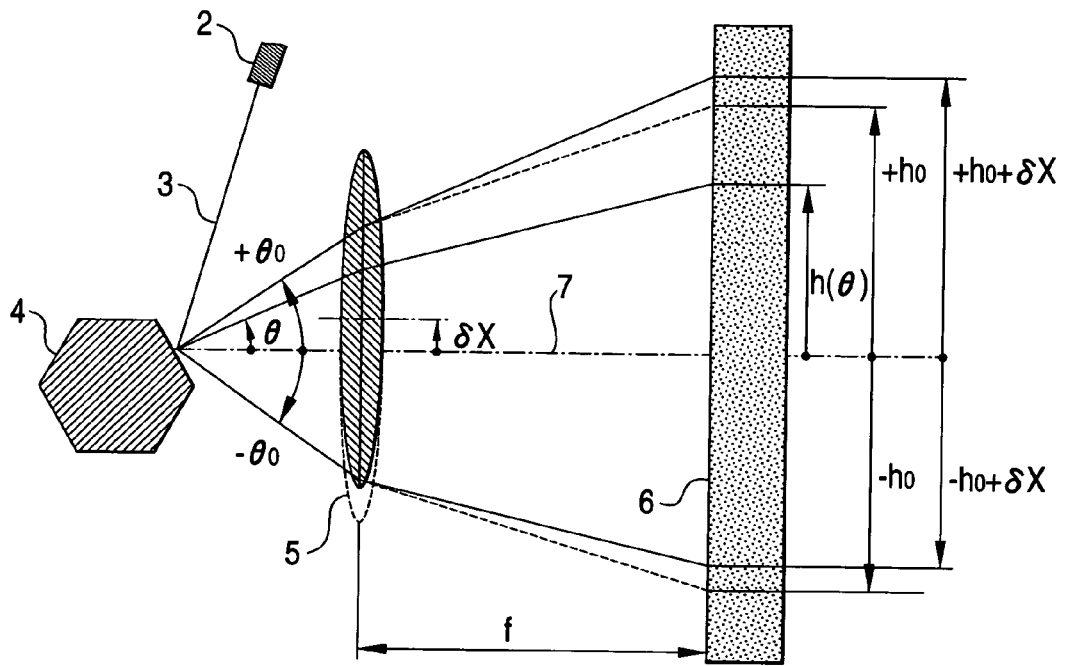
FIG. 3 is a view showing the function of the optical scanning apparatus of the invention.
Figure 4:
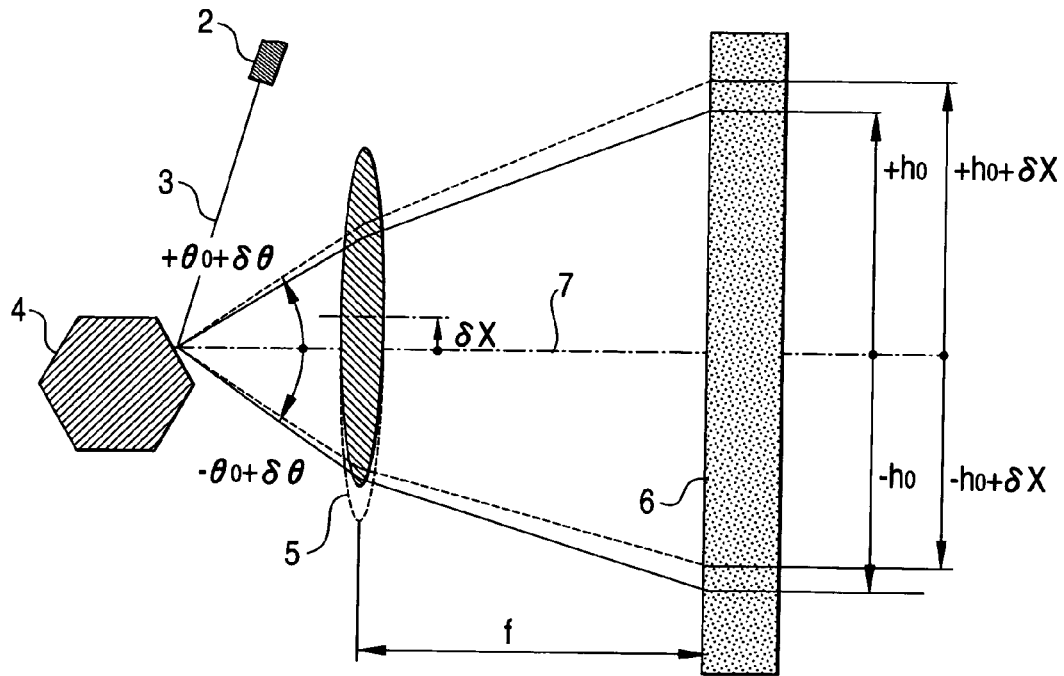
FIG. 4 is a view showing the function of the optical scanning apparatus of the invention.

Hereinafter, the function of the optical scanning apparatus of the invention will be described with reference to FIGS. 2 to 5. In FIGS. 2 to 4, the reference numeral 2 denotes a light source, 3 denotes a light beam, 4 denotes light deflecting member, 5 denotes a scanning optical element, 6 denotes a medium to be scanned, and 7 denotes the optical axis of the scanning optical element. The light deflecting member 4 is configured by a rotary polygon mirror, the scanning optical element 5 by an Fθ lens, and the medium to be scanned 6 by a photosensitive drum. The light beam 3 emitted from the light source 2 is deflected and scanned by the rotary polygon mirror functioning as the light deflecting member 4, and then scanned and imaged with substantial speed uniformity onto the photosensitive drum functioning as the medium to be scanned 6, by the Fθ lens functioning as the scanning optical element 5. When the angle formed by the light beam 3 that is deflected and scanned by the rotary polygon mirror and the optical axis 7 of the Fθ lens is θ (hereinafter, the angle is referred to as scanning angle), and the position of the light beam on the photosensitive drum with respect to an intersection of the optical axis 7 and the photosensitive drum is $h(\theta)$, a substantial linear relationship is established between $\theta$ and $h(\theta)$. Usually, the focal length f of the F$\theta$ lens is used as a proportional constant of the linear relationship. With respect to the rotary polygon mirror which is rotated at a constant speed, therefore, also the light beam on the photosensitive drum has speed uniformity.

At this time, an error of $h(\theta)$ is called F$\theta$ error $\epsilon(\theta)$, and indicated by expression (2):

$$\epsilon(\theta)=h(\theta)-f\theta \qquad (2)$$

When the scanning range on the photosensitive drum is ±ho and the scanning angle corresponding to ±ho is ±$\theta$o, $\epsilon(\theta o)=\epsilon(-\theta o)=0$ is attained. It is assumed that, as shown in FIG. 3, the F$\theta$ lens is deviated by a minute amount $\delta X$ with respect to the photosensitive drum in the scanning direction. In this case, as shown in FIG. 4, the scanning range corresponding to the scanning angle ±$\theta$o is ±ho+$\delta X$. In order to eliminate the deviation $\delta X$ in the scanning range, the scanning angle is corrected by a minute amount $\delta\theta$ to become ±$\theta$o+$\delta\theta$.

Figure 5:
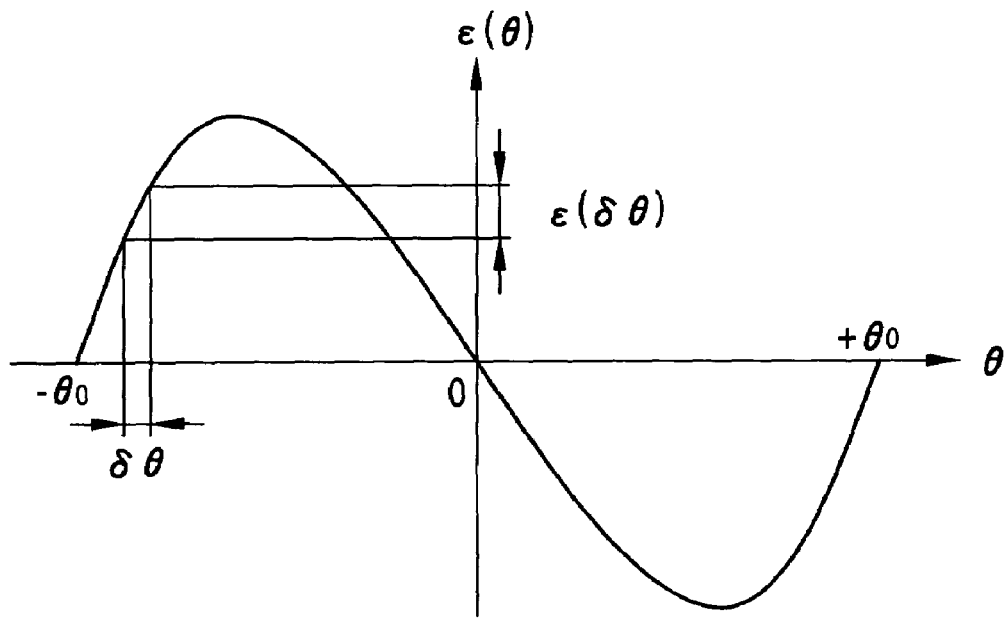
FIG. 5 is a view showing an example of an Fθ error.

Approximately, $\delta\theta=-\delta X/f$ holds. FIG. 5 shows an example of a change of the F$\theta$ error. In this case, $\Delta\epsilon(\delta\theta)$ is given by expression (3):

$$\Delta\epsilon(\delta\theta)=\epsilon(\theta+\delta\theta)-\epsilon(\theta)=d\epsilon(\theta)/d\theta \qquad (3)$$

When an allowable limit value of the F$\theta$ error is indicated by $\zeta$, following expression (4) holds:

$$|d\epsilon(\theta)/d\theta \cdot \delta\theta| \leq \zeta \qquad (4)$$

When the spatial scan density on the photosensitive drum is indicated by P, $\zeta$ is inversely proportional to P, and an approximate value of $\zeta$ is obtained by expression (5):

$$\zeta=0.1/P \qquad (5)$$

Furthermore, it is usually estimated that $\delta X$ has a proportional relationship with the scanning range ±ho, and its approximate value can be expressed by following expression (6):

$$\delta X=0.001 \cdot 2ho \qquad (6)$$

When the expressions are arranged, following expression (1) holds:

$$|d\epsilon(\theta)/d\theta| \leq 5.0 \times 10/P\theta o \qquad (1)$$

EMBODIMENT 1

Figure 1:
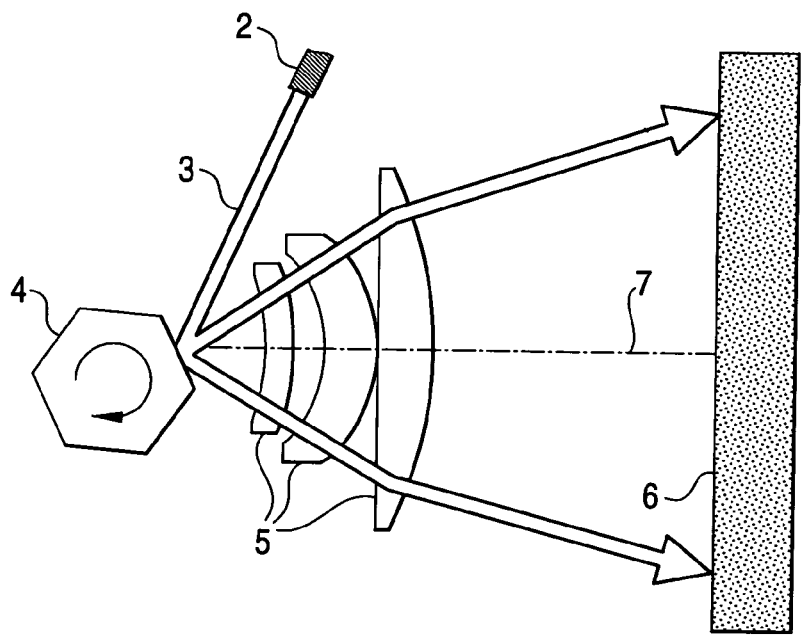
FIG. 1 is a diagram showing the configuration of an optical scanning apparatus of an embodiment of the invention.

FIG. 1 shows an embodiment of the optical scanning apparatus of the invention. In FIG. 1, the same reference numerals as those of FIGS. 2 to 4 denote the identical components. In FIG. 1, the scanning optical element 5 is configured by an F$\theta$ lens of a three-group three-element configuration.

Various values of the embodiment are listed in Table 1. In the table, surface number [1] indicates the reflecting surfaces of the rotary polygon mirror, surface numbers [2] to [7] indicate the surfaces of the three lenses constituting the F$\theta$lens, and surface number [8] indicates the surface of the photosensitive drum. The specifications of the rotary polygon mirror are shown in Table 2. Furthermore, P=600 dpi or 23.6 lines/mm, and $\theta o=0.75$ rad.

TABLE 1

| Surface number | Radius of curvature | Distance between surfaces | Index of refraction |
|---|---|---|---|
| [1] | ∞ | 40.3 | 1.0 |
| [2] | −73 | 6.1 | 1.649 |
| [3] | −100 | 16.3 | 1.0 |
| [4] | −183.7 | 15.9 | 1.758 |
| [5] | −116.1 | 4.9 | 1.0 |
| [6] | ∞ | 25 | 1.758 |
| [7] | −200 | 264.5 | 1.0 |
| [8] | ∞ | | |

TABLE 2

| | |
|---|---|
| Number of surfaces of rotary polygon mirror | 6 |
| Radius of inscribed circle of rotary polygon mirror | 26 mm |
| Incidence angle of light beam on rotary polygon mirror | 1.19 rad |

Figure 6:
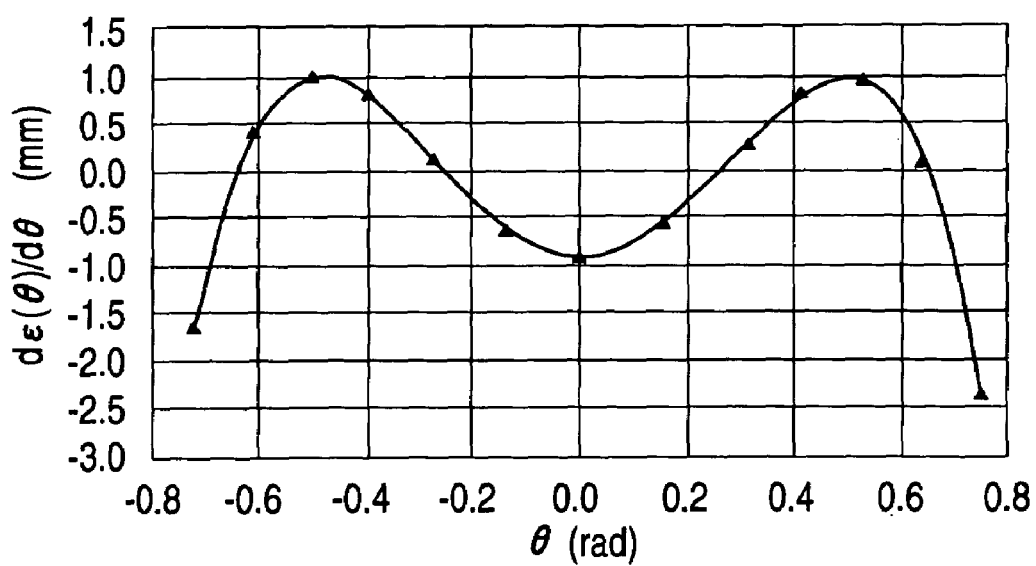
FIG. 6 is a view showing a first-order differential value of the Fθ error with respect to a scanning angle.

FIG. 6 shows calculated values of $d\epsilon(\theta)/d\theta$ in the optical scanning apparatus of the invention. When above-described P and $\theta$o are substituted in expression (1), following expression (7) holds. The results of FIG. 6 satisfy expression (7).

$$|d\epsilon(\theta)/d\theta| \leq 2.84 \text{ mm} \qquad (7)$$

Usually, the F$\theta$ error tends to be larger as the maximum scanning angle is larger. The invention is particularly effective in the case where $\theta o \geq 0.7$ rad.

In the above, the embodiment of a single optical scanning apparatus has been described. A multicolor image forming apparatus may be configured by using a plurality of optical scanning apparatuses. In this case, in order to prevent positional deviation among plural colors or the like from occurring, the relative values of the F$\theta$ errors of the optical scanning apparatuses must be severely suppressed. The invention is very effective for suppressing the values.

According to the invention, the accuracy of speed uniformity of a light beam on a photosensitive drum can be prevented from being lowered, and the performance of an image forming apparatus can be improved.

What is claimed is:

1. An optical scanning apparatus comprising:
   a light deflecting member for deflecting and scanning a light beam emitted from a light source; and
   a scanning optical element which scans and images the light beam that is deflected and scanned by the light deflecting member, onto a medium to be scanned, and the optical scanning apparatus satisfies following equation:

$$|d\epsilon(\theta)/d\theta| \leq 5.0 \times 10/P\theta o$$

where $\theta$ is an angle formed by the light beam that is deflected and scanned by the light deflecting member and an optical axis of the scanning optical element, $\epsilon(\theta)$ is an amount of positional deviation due to deviation from speed uniformity of the light beam on the medium to be scanned, P is a spatial scan density on the medium to be scanned, and $\theta$o is a maximum of an absolute value of the angle $\theta$.

2. The optical scanning apparatus according to claim 1, wherein a value of $\theta$o is $\theta o \geq 0.7$ rad.

3. An image forming apparatus comprising an optical scanning apparatus, wherein the optical scanning apparatus comprising:
a light deflecting member for deflecting and scanning a light beam emitted from a light source; and
a scanning optical element which scans and images the light beam that is deflected and scanned by the light deflecting member, onto a medium to be scanned, and the optical scanning apparatus satisfies following equation:

$$|d\epsilon(\theta)/d\theta| \leq 5.0 \times 10/P\theta o$$

where $\theta$ is an angle formed by the light beam that is deflected and scanned by the light deflecting member and an optical axis of the scanning optical element, $\epsilon(\theta)$ is an amount of positional deviation due to deviation from speed uniformity of the light beam on the medium to be scanned, P is a spatial scan density on the medium to be scanned, and $\theta o$ is a maximum of an absolute value of the angle $\theta$.

4. The image forming apparatus according to claim 3, wherein a value of $\theta o$ is $\theta o \geq 0.7$ rad.

5. An multicolor image forming apparatus comprising a plurality of optical scanning apparatuses, wherein the optical scanning apparatus comprising:
a light deflecting member for deflecting and scanning a light beam emitted from a light source; and
a scanning optical element which scans and images the light beam that is deflected and scanned by the light deflecting member, onto a medium to be scanned, and the optical scanning apparatus satisfies following equation:

$$|d\epsilon(\theta)/d\theta| \leq 5.0 \times 10/P\theta o$$

where $\theta$ is an angle formed by the light beam that is deflected and scanned by the light deflecting member and an optical axis of the scanning optical element, $\epsilon(\theta)$ is an amount of positional deviation due to deviation from speed uniformity of the light beam on the medium to be scanned, P is a spatial scan density on the medium to be scanned, and $\theta o$ is a maximum of an absolute value of the angle $\theta$.

6. The multicolor image forming apparatus according to claim 5, wherein a value of $\theta o$ is $\theta o \geq 0.7$ rad.

* * * * *